Aug. 6, 1968 R. H. BRISTOW 3,395,993
TITANIUM ACTIVATED NICKEL SEAL AND METHOD OF FORMING IT
Original Filed July 11, 1963
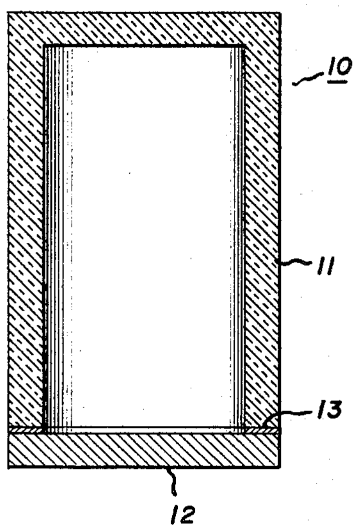
INVENTOR:
ROBERT H. BRISTOW,
BY James J. Lichiello
HIS ATTORNEY.

United States Patent Office 3,395,993

Patented Aug. 6, 1968

3,395,993

TITANIUM ACTIVATED NICKEL SEAL AND METHOD OF FORMING IT

Robert H. Bristow, Burnt Hills, N.Y., assignor to General Electric Company, a corporation of New York Continuation of application Ser. No. 294,340, July 11, 1963. This application June 22, 1966, Ser. No. 559,695
3 Claims. (Cl. 29—195)

This invention relates to seals generally, and more particularly, to metal alloy seals for ceramic-to-ceramic and ceramic-to-metal sealing. Specifically, this invention relates to thin metal layer type seals between adjacent surfaces where the seals contain preferred compoistions of nickel and titanum. These seals are especially adaptable for use, at high temperature conditions, with exposure to alkali metal vapors, under high vacuum conditions or various combinations of these conditions. This application is a continuation of application of now abandoned copending application Ser. No. 924,340, Bristow, filed July 11, 1963, and assigned to the same assignee as the present invention.

Various sealing techniques are commonly employed to effect ceramic-to-ceramic and ceramic-to-metal seals for general application in electronic devices. Among these methods are (1) active alloy sealing and (2) refractory metal metallizing. In the active metal alloy sealing method, a molten brazing alloy is suitably doped or "activated," for example by the addition of a small amount of titanium or zirconium, to impart wetting and bonding characteristics, thereby permitting direct union of the ceramic and metal members to be joined. In the refractory metal-metallizing method, a thin layer of powdered refractory metal (usually with admixed metals or oxides) is sintered to the surface of a ceramic in order to provide a metallic layer to which a conventional braze can be made.

Such prior art seals are generally unsuitable for applications such as high temperature-alkali metal vapor environments. In a high temperature-cesium vapor environment the mentioned seal is subjected to sublimation, cesium corrosion of the constituent materials or degradation of the ceramic-to-metal bond. For example, it has been found that silica-containing high alumina ceramic (94% to 99% alumina) are readily attacked by cesium vapor at high temperature, above about 600° C., and any metallizing layers having been applied thereto, such as by the well known molybdenum-manganese process, are similarly attacked. The metallizing of high purity alumina ceramics (greater than 99.5% alumina) without introduction of secondary phases which are susceptible to cesium attack, is not readily accomplished. Furthermore, the metals and alloys commonly used in electronic devices to effect seals to metallized ceramic surfaces, or to act as a sealing alloy in an "activated" process, such as gold, copper, palladium, platinum, silver, and alloys thereof, are not resistant to attack by cesium vapor at elevated temperatures.

Accordingly it is an object of this invention to provide an improved metal alloy seal.

It is another object of this invention to provide an improved metal alloy seal for joining ceramics to ceramics and ceramics to metals.

It is another object of this invention to provide an improved nickel-titanium alloy seal.

It is another object of this invention to provide an improved high temperature seal utilizing a nickel-titanium alloy for bonding to a ceramic object.

It is another object of this invention to provide an improved high temperature seal utilizing a nickel-titanium alloy for bonding to a high purity alumina object.

It is a further object of this invention to provide an improved high temperature seal of the nickel-titanium alloy type which is extremely resistant to attack by alkali metal vapors, particularly cesium vapor.

It is a still further object of this invention to provide an improved metal to ceramic seal utilizing an interface of $TiNi_3$ or titanium containing nickel solid solution in a nickel-titanium alloy seal.

It is still another object of this invention to provide an improved nickel-titanium alloy seal for joining high purity alumina to nickel or tantalum.

It is again another object of this invention to provide an improved method of forming nickel-titanium alloy seals.

Briefly described this invention comprises forming a metal alloy bond or seal between adjacent ceramic, or ceramic and metal surfaces, where the metal alloy consists essentially of nickel and titanium in the composition range of between about 54 to 90 weight percent nickel, balance titanium. More preferentially, for high purity ceramic to metal seals, the composition range is chosen to be between about 75 to 90 weight percent nickel, balance titanium. Compositions and sealing temperatures are controlled to promote the formation of desirable phase such as TiNi, $TiNi_3$, Ni-solid solutions and to minimize the formation of undesirable phases which could lead to seal embrittlement.

This invention will be better understood when taken in connection with the following description and the drawings in which:

The figure illustrates one preferred embodiment of this invention as applied to a ceramic closure member sealed to a metal base.

The use of titanium-nickel alloys, for example by means of the titanium-nickel shim technique, to hermetically seal a metal to a ceramic is well known. For example, in order to seal titanium to a ceramic, nickel foil, or a thin shim of nickel is interposed between the surfaces to be joined, and upon heating of the joint to a temperature of the lowest melting eutectic in the titanium-nickel system (942° C.) a liquid alloy is formed which wets and bonds the ceramic. As another example, in order to seal a ceramic to a metal other than titanium, for example tantalium, it has been the practice to use thin shims of both titanium and nickel in the proper proportions so as to yield, upon melting, a melt having the desired eutectic composition.

It has been discovered, however, that certain of the solidified nickel-titanium alloys deleteriously affect the bond, and more particularly the high temperature capability of said bond, between metals and ceramics in the above described processes. Upon examination of prior art nickel shim seals of titanium to ceramic it was found that the alloys formed contained several phases, predominantly alpha titanium and the intermetallic compound $Ti_2Ni$. It has been further found that the titanium phase in such alloy seal is severely hardened and embrittled by the products of reaction (aluminum and oxygen) of the active metal titanium and an alumina ceramic, when exposed to high temperatures, leading to failure of the seal. Such failures appear to result from the difference in thermal expansion between the several metallic phases and the ceramic, and the inability of the embrittled alloy to strain plastically or elastically.

Embrittlement of the titanium phase may be initiated as a result of overbrazing during the initial sealing process. Overbrazing may occur as a result of excessive temperature and/or excessive time at the required temperature. More importantly it has been found that embrittlement of the titanium phase occurs through continued reaction of the active titanium phase with the ceramic when a seal is subsequently exposed to high temperatures, for example during the operation of a thermionic converter tube. Seals of this type containing the embrittled titanium have been found to fail within a few hours at a temperature of 900° C.

It has been discovered, however, that if the composition of a titanium activated nickel sealing alloy is so adjusted that the phases alpha titanium and $Ti_2Ni$ are not permitted to form or their formation is substantially minimized, and furthermore, that the time-temperature treatment is selected to promote the formation of the phases TiNi, $TiNi_3$ and/or nickel solid solution, the aforementioned problems are circumvented. More specifically, the nickel-titanium sealing alloy compositions which have been found suitable are those containing about 54 to 90 weight percent nickel, balance titanium. Alloys having compositions about 54 weight percent nickel will contain predominantly the phase TiNi. Those compositions of about 78 weight percent nickel will contain predominantly $TiNi_3$ and those with nickel contents in excess of 88 weight percent nickel will contain primarily the nickel solid solution. Intermediate compositions will contain at least two of these phases. In those alloys having lesser amounts of nickel a greater number of failures occur and seals are more difficult to prepare.

Accordingly a preferred form of this invention relates to the use of nickel-titanium alloys containing a higher percent of nickel as for example from about 75 to 90 weight percent nickel with the balance titanium. Alloys in this composition range are more insensitive to overbrazing temperature conditions and are widely applicable to ceramic-to-ceramic and ceramic-to-metal sealing generally. Analysis of seals of this composition indicate not only minimal formation of undesirable phases under most sealing conditions, but also the formation of certain phases such as $TiNi_3$ and nickel solid solution which are favorable to good seals.

The use of the described alloys as a metal alloy bonding means between ceramics, and between ceramics and metals, may be carried out by various processes known in the art. For example, the alloy may be provided in powder form, shim stock form, or by shims of the different metals corresponding to the alloy desired. Thereafter the surfaces to be sealed are joined with the alloy therebetween and subjected to elevated temperatures to melt the alloy to form the joint. Such melting should be generally held to a minimum, for example from a few seconds to a few minutes at the point at which molten conditions have been reached. An operative range in the practice of this invention has been found to be from about a few seconds after melting has been observed to about four minutes. The general temperature range is from about 1100° C. to about 1350° C. More specifically, the alloy seals of this invention in the 75 weight percent nickel and above range are formed at temperatures adjacent the third eutectic point of nickel titanium and in the general range of about 1250° C. to 1350° C.

Various seals have been made in accordance with the practice of this invention by using shims of titanium and nickel in thicknesses calculated to provide the desired alloy composition. These seals were provided between ceramic objects, and between ceramic and metal objects. More specifically, seals were provided between butt ended ceramic cylinders and between ceramic cylinders and metal disks or washers. These seals were then life tested at elevated temperatures and under high vacuum of about $1\times10^{-6}$ mm. Hg. Similar seals were also tested for resistance to alkali metal vapor attack, particularly cesium, at elevated temperatures. One such assembly is illustrated in FIG. 1.

Referring now to FIG. 1 there is shown an enclosure assembly 10 which comprises a ceramic enclosure menber 11 of generally cylindrical configuration sealed to a metal member 12 by means of a thin alloy film bond 13. Film 13 may only be microscopic thickness where members 11 and 12 are for example ceramic and nickel respectively. FIG. 1 is representative of a seal between two adjacent surfaces and more particularly a seal for a closure member which may be evacuated or gas-filled.

In operative examples of this invention the specimen ceramics include polycrystalline ceramic cylinders of 0.690 inch outside diameter, 0.480 inch inside diameter, and 0.200 inch length. These ceramic cylinders were either butt sealed to each other or to either side of a metal washer forming what are referred to as ceramic-to-ceramic or ceramic-to-metal seals respectively. The ceramic cylinders were prepared by conventional ceramic fabrication techniques including ball milling of the constituent materials, spray drying to form pressing granules, dry pressing and firing to maturity. The ends of the cylinders were ground flat and parallel with a 220 grit diamond wheel. The specimens were also ultrasonically cleaned using detergent water solution and acetone rinses followed by air firing to a temperature of 1000° for one hour.

Two important types of ceramic which were used in these cylinders were (1) a polycrystalline alumina containing a small amount of MgO as a grain growth inhibitor and sintered to a density of approximately 99.5% theoretical, and (2) a 97% alumina containing CaO, MgO and $SiO_2$ and fluxing agents. Ordinarily only the pure sintered alumina is sufficiently resistant to cesium attack to permit use at temperatures above about 600° C. Two of the ceramic cylinders were sealed to each other or to either side of a metal washer through the use of nickel-titanium alloys which were liquid or partly liquid at the sealing temperature. The metal washers to which seals were made included titanium, tantalum, nickel, Kovar alloy (Ni-Co-Fe), 304 stainless steel and 430 stainless steel. These metal washers were normally about 0.010 inch thick and had the same inside and outside diameter as the ceramic cylinders.

The active sealing alloy was obtained at the sealing temperature by fusion of titanium and nickel foil washers of the proper thickness to yield the desired alloy composition. Seals to nickel, Kovar alloy, and 304 stianless steel were also made using only a titanium foil washer and relying on eutectic formation with the nickel content of the metal. Nickel foil which was used was about 0.0003 inch thick. Titanium foil was used in three different thicknesses, 0.00025 inch, 0.0005 inch and 0.001 inch. All metal washers and foil were cleaned using accepted electron tube processing methods. By analysis the major impurity for the titanium was carbon in a range of about 0.0129 to 0.0346 weight percent. Other impurity elements were about 0.01 weight percent iron, 0.005 weight percent manganese, less than about 0.001 weight percent copper and 0.001 weight percent silicon. All specimens were sealed in a vacuum bell jar in an electrical resistance heated oven. Seals made in accordance with the practices of this invention were life tested at temperatures from 700° C. to 900° C. in a vacuum environment with cycling to room temperature every 240 hours. The seals were examined with respect to vacuum tightness, flexural strength, microstructure and hardness of the sealing alloy, as well as changes in these properties which occurred as a result of long time heat treatment.

Best results were obtained in the practice of this inventino in ceramic to metal seals generally, and particularly in relation to seals of high purity alumina to tantalum and high purity alumina to nickel. The preferred brazin galloys for these seals are alloys having the composition containing from about 75 to 90 weight percent nickel with the balance titanium. This cmposition range encompasses the highest melting eutectic (11.6 weight percent titanium, 88.4 weight percent nickel) and which would contain $TiNi_3$ and a nickel solid solution. An alloy at the upper end of the mentioned range would consist of a titanium containing nickel solid solution.

It is also a preferred practice of this invention that special attention be given to time at sealing temperature in providing an alloy seal between a ceramic and nickel surface. This time-temperature cycle determines whether or not the desired phases of $TiNi_3$ or titanium-containing nickel solid solution are obtained. For example, seals to nickel made at a temperature just below the 1304° C. eutectic contain predominantly $TiNi_3$ at the interface. Seals made at a temperature slightly above the 1304° C. eutectic contain a nickel solid solution at the ceramic-nickel interface. The time during which the seals are maintained at their melting temperature should generally be maintained at a minimum, for example just long enough to provide melting of the metal alloy and wetting of the ceramic. Such seals are easily and reproducibly made and show excellent strength. They have withstood over 910 hours of exposure to a temperature of 900° C. and have remained vacuum tight when tested on a helium mass spectrometer leak detector. Seals made at a temperature slightly above the 1304° C. eutectic appear to be more sensitive to time at sealing temperature than were those seals having the $TiNi_3$ interface.

The objects of this invention have thus been achieved by providing a nickel-titanium alloy seal which is alkali metal vapor resistant and very high temperature tolerant. More particularly the alloy seal between ceramics and mteals comprises a nickel-titanium alloy preferably in the range of 75 to 90% nickel, balance titanium, and essentially free of undesirable alpha titanium or $Ti_2Ni$.

While this invention has been described in connection with given specific examples, it will be readily apparent that the invention is subject to variations and modifications by those skilled in the art, and it is intended in the appended claims to cover all such variations and modifications as come within the true spirit and scope of the invention.

What is claimed as new and desired to be secured by Leters Patent of the United States is:

1. A seal assembly comprising in combination, a ceramic member, and a second member taken from the class consisting of ceramics and metals, said members being positioned in adjacent operative relationship, and a thin film of alloy therebetween securely joining said members, said alloy consisting of nickel and titanium in the range of 75 to 90 weight percent nickel, balance titanium, said alloy being substantially free of the phases alpha titanium and $Ti_2Ni$, and containing a phase ranging from predominantly $TiNi_3$ to predominantly a nickel solid solution, said alloy being formed while between said members in the temperature range of about 1250° C. to 1350° C.

2. A method for joining a ceramic member to a second member taken from the class consisting essentially of ceramics and metals which comprises cleaning said members placing on a surface of one of said members a combination of about 75 to 90 weight percent nickel, balance titanium, placing the other of said members on said combination, heating said composite to a temperature in the range of above about 1250° C. to 1350° C., so that a molten nickel-titanium alloy forms from said combination and seals said members together, and controlling said time-temperature sealing operation to prevent substantial formation of the phases alpha titanium and $Ti_2Ni$, and to form a phase from predominantly $TiNi_3$ to predominantly nickel solid solution.

3. The invention as recited in claim 2 wherein said time for said time-temperature sealing operation is less than about four minutes after melting of said combination occurs.

References Cited

UNITED STATES PATENTS

| | | | |
|---|---|---|---|
| 2,822,269 | 2/1958 | Long | 29—504 X |
| 2,847,302 | 8/1958 | Long | 29—504 X |
| 2,857,663 | 10/1958 | Beggs | 29—49 X |
| 2,859,512 | 11/1958 | Dijksterhuis | 29—498 X |
| 2,902,755 | 9/1959 | Salt | 29—504 X |
| 2,906,008 | 9/1959 | Boegehold | 29—498 X |
| 2,996,795 | 11/1961 | Stout. | |
| 3,091,028 | 5/1963 | Westbrook | 29—504 X |
| 3,106,773 | 10/1963 | Jaffe | 29—487 |

FOREIGN PATENTS

| | | |
|---|---|---|
| 809,125 | 2/1959 | Great Britain. |
| 36-7710 | 1961 | Japan. |

JOHN F. CAMPBELL, *Primary Examiner.*

R. F. DROPKIN, *Assistant Examiner.*